June 17, 1924.

A. S. JONES 1,497,913

FRUIT CUTTER AND SLICER

Filed June 20, 1923   3 Sheets-Sheet 1

INVENTOR
A. S. JONES
BY
ATT'YS

June 17, 1924.
A. S. JONES
FRUIT CUTTER AND SLICER
Filed June 20, 1923   3 Sheets-Sheet 2
1,497,913
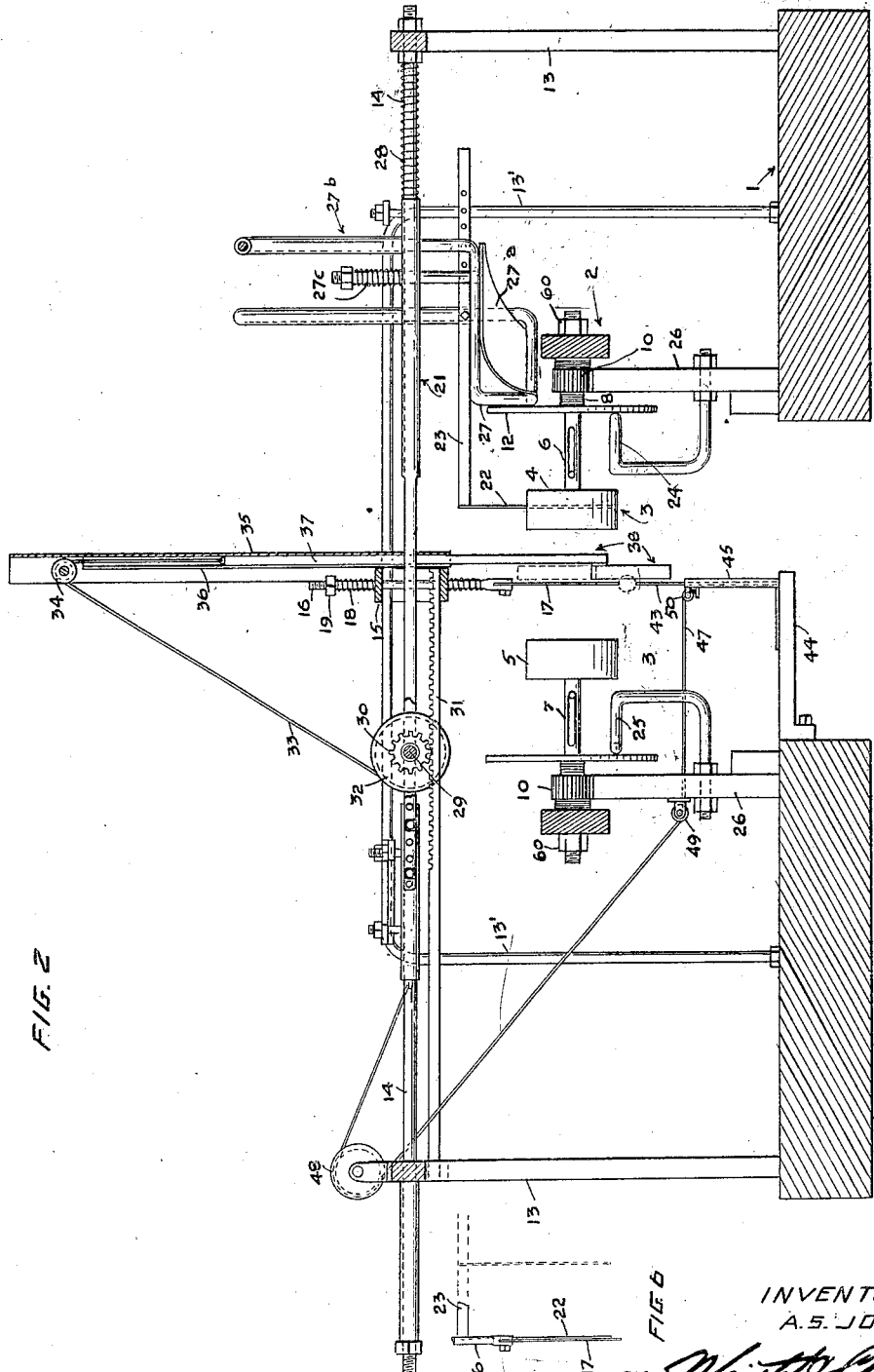
INVENTOR
A. S. JONES
BY
ATT'YS.

June 17, 1924.
A. S. JONES
FRUIT CUTTER AND SLICER
Filed June 20, 1923   3 Sheets-Sheet 3
1,497,913
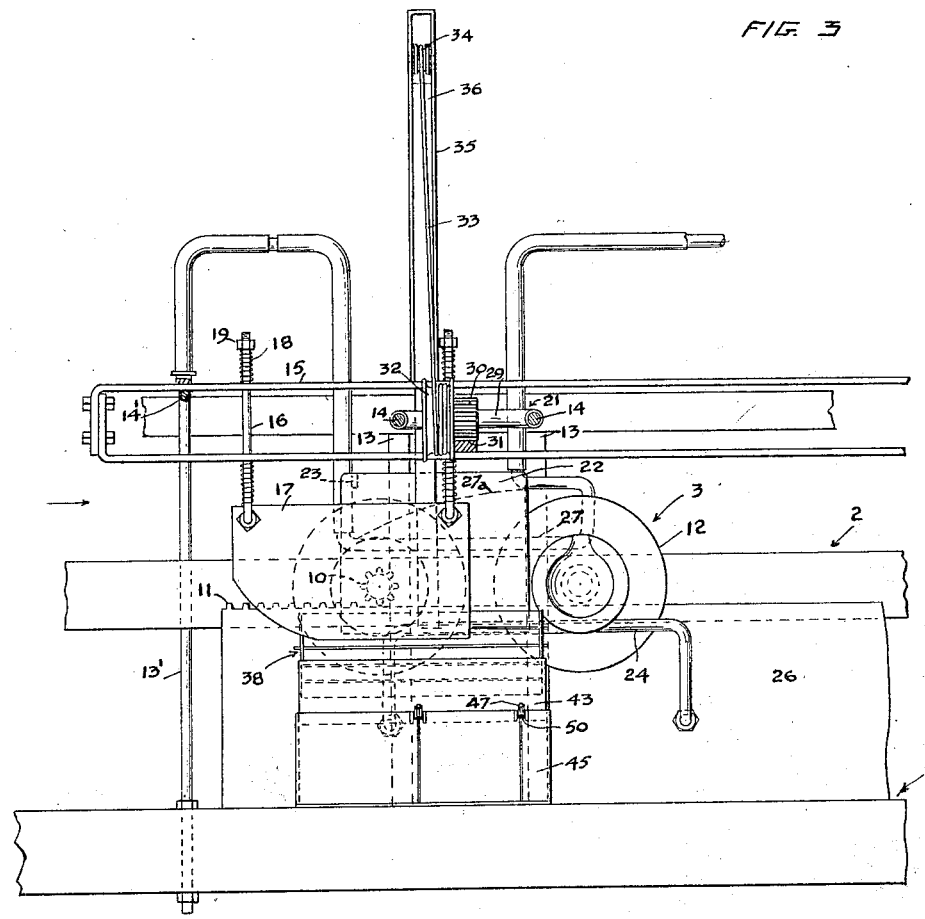
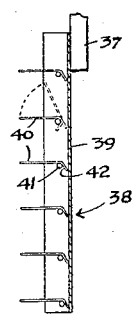
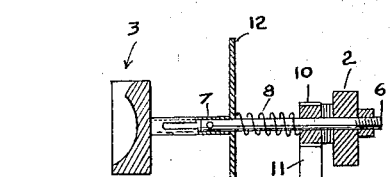
INVENTOR
A. S. JONES
ATT'YS Patented June 17, 1924.

1,497,913

UNITED STATES PATENT OFFICE.

ADRIAN S. JONES, OF REDWOOD CITY, CALIFORNIA.

FRUIT CUTTER AND SLICER.

Application filed June 20, 1923. Serial No. 646,565.

*To all whom it may concern:*

Be it known that I, ADRIAN S. JONES, a citizen of the United States, residing at 311 Spruce St., Redwood City, in the county of San Mateo and State of California, have invented new and useful Improvements in Fruit Cutters and Slicers, of which the following is a specification.

This invention relates to improvements in apparatus for slicing and removing pits or stones from fruit preparatory to canning or drying of the fruit.

The primary object of the invention is to provide apparatus of the character described which will effectively slice or halve and remove the stones from large quantities of fruit without bruising or mutilating the fruit, in less time and at less expense as compared to the ordinary slicing or cutting operations.

An object of the invention is to provide a simply constructed and highly efficient machine of this character which is positive in its operation, requires little or no attention when in operation and is therefore inexpensive to operate.

Another object of the invention is to provide a novel and reliable means for removing the stone or pit from fruit without damaging the pieces of fruit, this means being automatic in operation.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 2 represents a vertical sectional view of apparatus of the invention.

Fig. 3 represents a side elevation of the apparatus.

Fig. 4 is a detail sectional view of one of the fruit pitting devices.

Fig. 5 is a detail section of the fruit holder.

Fig. 6 is a fragmentary front or end elevation of one of the cutting knives showing the fruit supporting member as associated therewith.

Figure 1:
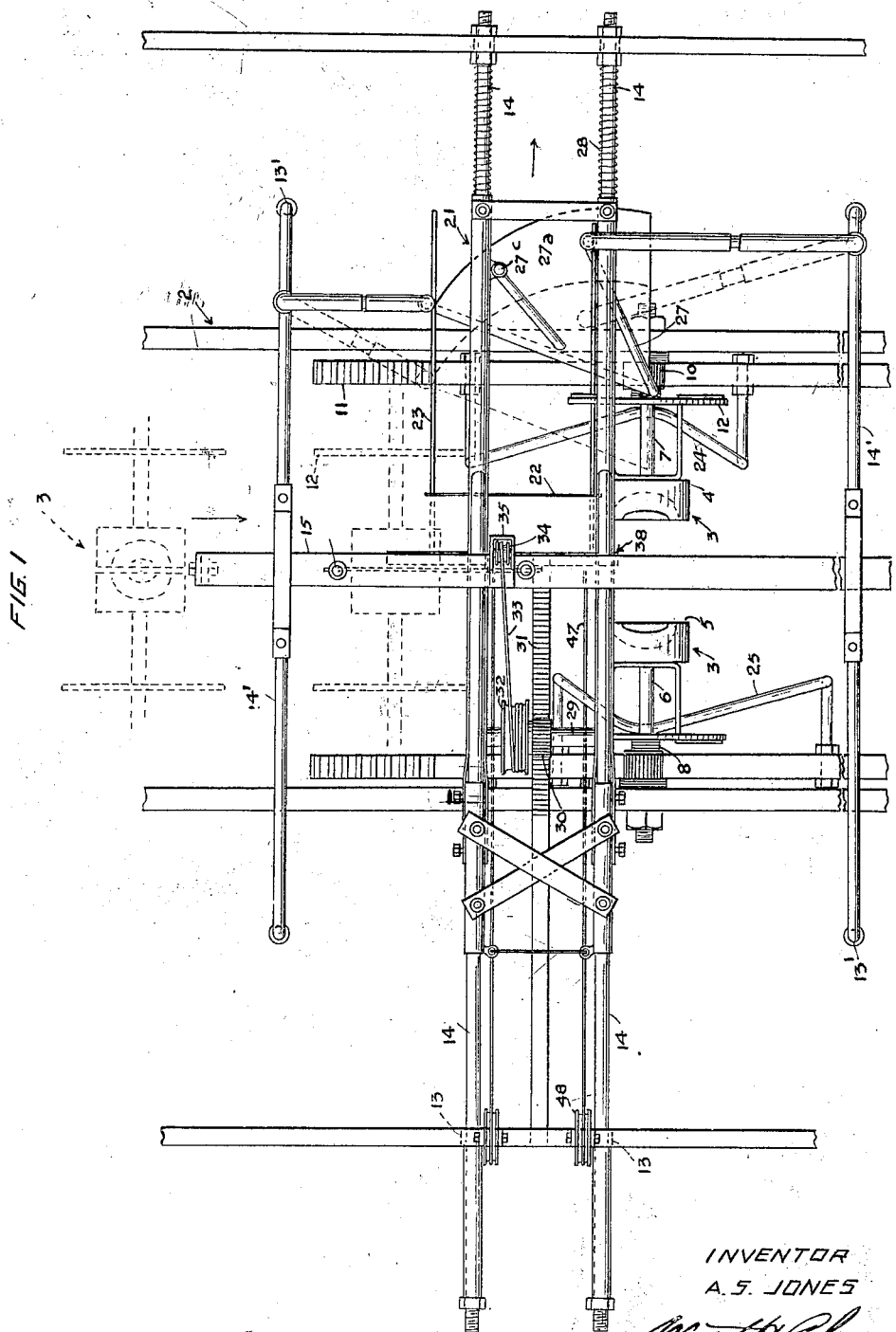
Fig. 1 represents a fragmentary plan view of apparatus constructed in accordance with my invention.

In the embodiment of the invention shown in the accompanying drawings there is provided a frame 1 in the form of a table or like support, on which a carriage generally designated 2 is reciprocally mounted. The carriage supports a plurality of fruit holding devices generally designated 3, each of which devices is adapted to hold a piece of fruit and to move the same into position to be divided and the stone or pit removed.

Each clamping device comprises opposed jaws 4 and 5, which jaws are provided with complementary concavities on their opposed faces and are mounted on shafts 6, which shafts are journaled in the carriage 2. Each of the shafts is formed of sections 7 telescopically arranged and by means of an expansion spring arrangement 8, the sections of the shafts supporting the jaws are at all times urged outwardly so that the jaws normally lie close to one another in position to receive the fruit. The concavities or depressions in the faces of the jaws are flared so as to form a mouth to permit of the insertion of the fruit between the jaws. The shafts carry pinions 10 which are adapted to cooperate with rack bars 11 mounted on the frame 1. These shafts also carry disks 12, for a purpose which will be later more fully described.

Carried by upright standards 13 and 13' are rods 14 and 14'. The rods 14' support members 15 which extend longitudinally of the carriage and support bolts 16, to the lower ends of which a long knife 17 is attached. Springs 18 are mounted on the bolt so as to permit the bolt to yield when the knife is forcibly engaged by a piece of fruit where it is cut or engaged by the stone or pit of the fruit. By means of a nut 19 turned on the upper end of the bolt, the position of the bolt and knife may be changed to suit the kind of fruit being handled in the machine or to provide for cutting the fruit of varying sizes.

A frame or carriage generally designated 21 is reciprocally mounted upon the rods 14. The frame 21 carries on one side of the knife a fruit spreading or separating blade 22, which blade normally lies close to the knife, being supported by an arm 23 suitably attached to the frame 21. When the frame is moved, the spreading blade is moved into dotted line position shown in Fig. 6 away from the knife and separates one half of the fruit from the remaining half containing the stone or pit, whereby access to the pit or stone may be had. The frame is moved by the disks 12 on the shafts 6. These disks engage with longitudinal extending cam members 24 and 25 mounted on upright frame pieces 26 attached to the main frame 1. The cam members are arranged so that the fruit holding jaws, after a slicing operation, will be spread apart due to engagement of the disks 12 with said cam members, as the carriage 2 is moved in one direction. As the jaws are spread apart the disk for the jaw 4 moves into contact with a similar cam member 27 which is carried by the frame 21. The cam member 27 is arranged such that when engaged by the disks 12, the frame 21 will be moved from left to right in the direction of the arrow shown in Fig. 1. The frame 21 is moved against the action of the expansion springs 28 arranged on the rods 12 and said springs act to return the carriage to normal position.

A shaft 29 is mounted on the frame 21 and carries a pinion 30 which is adapted to mesh with the teeth of a rack bar 31 fixed to the members 15 and 13. A pulley 32 is also fixed to the shaft 29 and has a flexible element or cable 33 attached thereto. The cable 33 extends upwardly and around a pulley 34 carried on the upper end of an upright support 35 attached on the members 15. The cable then leads downwardly into a guide 36 and is attached to means generally designated 38 for removing the stone or pit. This means is moved into position to remove the pit coincident with the movement of the carriage or frame 21 to the right. The fruit pitting device 38 comprises a frame 39 in which a plurality of small blade like members 40 are pivoted as at 41 with stop members 42 provided on the inner ends of said members 40. These devices are arranged in a vertical row or series in the frame and simulate wooden shutters or blinds. They project outwardly from the frame so that when the frame is moved vertically the outer ends of said members will contact with the pit or stone of the fruit, which pit or stone is disposed at the lower edge of the knife blade. Preferably the members 40 are arranged so that as they move downwardly past the stone, they will be rocked freely on their pivots and will not effect the removal of the pit but upon the up movement thereof, as when the frame or carrier 21 returns to normal position, through the action of the spring 28, said members 40 will engage and remove the stone or pit of the fruit.

Means is provided for preventing fruit from dropping immediately when the jaws 4 and 5 are moved apart upon the completion of the slicing or cutting of the fruit, and this means includes a disk or plate 43, which serves as a jaw and is vertically adjustably mounted in a guide 45 carried by an extension 44 attached to the frame 1. This member 43 is disposed in alinement with the knife 17 so that when it is moved into up position as shown in Fig. 2, it will, with the knife, serve to clamp opposite sides of the stone or pit of the fruit. The movement of the plate 43 is provided for by a cable or flexible element 47 which is attached to the frame 21 and extends around a pulley 48 mounted on one of the standards 13. From the pulley 48 the cable extends downwardly and inwardly around the pulley 49 on one of the frame members 26, through the member 26 and around the pulley 50 on the guide 45, and then downwardly to a point where it is connected to the lower part of the plate 43. Thus it will be seen that the carriage 21 is pulled to the right, the cable 47 is pulled and the plate or jaw 43 is lifted upwardly into operative position.

The jaws 4 and 5 may be adjusted so that they will hold pieces of fruit of different sizes by adjusting nuts 60 on the threaded ends of the shafts 6 and 7.

In the operation of the machine the carriage which is reciprocated by motive power derived from any suitable source, not shown, is put into operation and the operator stands so as to place the fruit, for example peaches, in the holders prior to their being moved to the knife. The jaws of the holders are normally close to one another as shown in Fig. 1, and they advance with the carriage in the direction of the arrow shown in said figure. As soon as the knife enters the space between the jaws and comes into contact with the pieces of fruit, the pinions 10 on the shaft 6 come into contact with the rack bars 12 and as the carriage is advanced, the shaft 6 and holders with the fruit therein, are revolved. This revolving of the holders and pieces of fruit causes the fruit to be cut circumferentially around the stone or pit, the rack bar being just long enough to cause the holders to make one complete revolution while the fruit is engaged with the knife. Following the circumferential cutting of the fruit, the disk 12 for the jaw 4 will engage the cam members 24 and cause the jaw 4 to be moved away from the jaw 5 against the action of the springs 8. The disk 12 is thus moved with the jaw 4 away from the knife and engages the member 27 and causes the carriage or frame 21 to be moved in the direction of the arrow shown in Fig. 2. This disk 12 for the jaw 4 engages the cam 24 before the disk 12 for the jaw 5 engages its cam 25, due to the fact that the cam 24 is arranged in advance of the cam 25 and because of this, the jaw 5 remains in position holding the fruit against the knife. The dividing or separating blade 22 is then moved from position lying close to the knife as shown in Fig. 6, into dotted line position shown in Fig. 6 and the full line position shown in Fig. 2. Inasmuch as said blade is supported by the carriage 21, as the blade moves away it carries with it one half of the piece of fruit, the other half being held in place with the stone or pit therein, by the jaw 5. The separated half of the piece of fruit is allowed to drop into a suitable receptacle provided for the sliced fruit, not shown. As the carriage advances, the disk 12 for the jaw 5, engages the cam 25 and causes said jaw 5 to move away from the piece of fruit and causes the carriage 21 to move further. As the carriage moves further, it pulls on the cable 47, lifts up the plate 43, so that it binds the pit or stone against the lower edge of the knife. This action takes place substantially simultaneously with the movement of the separating blade 22 away from the knife and said plate 43 causes the stone with the other half of the fruit thereon to be held in position. When the carriage is moved, the shaft 29 is rotated, due to the engagement of the pinion 30 with the rack 31 and the pulley is turned so as to unwind the cable 33 and allow the pitting device 38 to drop by gravity along the side of the knife 20 and plate 43. As the member 30 drops downwardly, the blades 40 rock freely on their pivots and immediately when the disks 12 begin to move in the opposite direction due to the shape of the cams 24 and 25, the springs 14 will move the frame or carriage 21 back to normal position, wind up on the pulley 32 and pull on the cable 33. This will lift the device 38 and cause the blades 40 to strike against the pit so as to force or eject the pit, the knife or plate 43 thereby removing the pit from the other piece of fruit causing the pit to drop down on one side of the plate and the fruit on the other side. Suitable means may be provided for catching the pits and pieces of fruit. The carriage continues to move until the next holding device is brought to cooperate with the cams 25. The reciprocating carriage thus provides for an expeditious handling of large quantities of fruit to provide for cutting the fruit in half and removing the stone or pit. One of the main features of the invention is the accuracy and reliability of operation which is provided for an efficient and clean cutting in half of the fruit and the positive removal of the stone without, in either case, bruising or mutilating the fruit or causing the mechanism to jam. The knife in being yieldingly mounted will be prevented from being damaged when it strikes large stones or pits.

It will be seen that a large carriage may be constructed with a great number of holding devices whereby upon movement of the carriage through a predetermined distance in one direction, a plurality of pieces of fruit may be cut and pitted in an effective and expeditious manner.

The cam 27 is provided with a flared skirt portion 27$^a$ adapted to be engaged by the disk 12 for the jaw 4 on the return movement of the carriage. The cam 27 is supported on a vertically adjustable frame 27$^b$, which frame is normally urged downwardly by a spring 27$^c$. On the return movement of the main carriage 2, the frame 21 will have moved inwardly to such an extent by the time that the disk 12 is close to the cam 27, that said disk will engage the skirt portion 27$^a$ and lift the skirt portion and cam member 27, permitting the carriage to move past said portion without interference. It will thus be seen that the cam member 27 and frame 27$^b$, will yield vertically on the return movement of the carriage as herein described.

I claim:

1. A machine for cutting and pitting fruit comprising a frame, a carriage movable on the frame, a knife on the frame, a holder on the carriage arranged to support a piece of fruit in position to be engaged by the knife upon movement of the carriage, a blade arranged adjacent the knife and adapted to enter the cut in the fruit made by the knife and means automatically moving the blade away from the knife to remove one half of the fruit from the remaining portion.

2. A machine for cutting and pitting fruit comprising a frame, a knife on the frame, means for moving pieces of fruit into engagement with the knife, a blade adjacent the knife arranged to enter the cut in the fruit made by the knife, means operating automatically, when the fruit has been cut a predetermined extent, to move the fruit away from the knife and separate one half of the fruit from the remaining half and pit and means causing the fruit to turn through one revolution while engaged with and being cut by the knife.

3. A machine for cutting and pitting fruit comprising a frame, a knife on the frame, means for moving pieces of fruit into engagement with the knife, a blade adjacent the knife arranged to enter the cut in the fruit made by the knife, means operating automatically, when the fruit has been cut a predetermined extent, to move the fruit away from the knife and separate one half of the fruit from the remaining half and pit and means operating automatically following the movement of said blade away from the knife to engage and remove the pit from the remaining half of the piece of fruit.

4. A fruit cutting and pitting machine comprising a frame, a knife on the frame, means for moving the piece of fruit into engagement with and along said knife, means for causing the fruit to rotate while being moved in engagement with the knife, a member adapted to enter the cut in the fruit held by the knife located adjacent to the knife, means for moving said member laterally to separate one half of the piece of fruit from the remaining half and pit, means for holding the remaining half and pit in place during the removal of the first named half and means operating automatically following the removal of the first named half after engaging and removing the pit from the remaining half.

ADRIAN S. JONES